United States Patent [19]

Handsman

[11] 4,089,604
[45] May 16, 1978

[54] EASEL WITH MASKING FRAME
[75] Inventor: Frederic B. Handsman, Bayside, N.Y.
[73] Assignee: Ehrenreich Photo-Optical Industries, Inc., Garden City, N.Y.
[21] Appl. No.: 731,943
[22] Filed: Oct. 13, 1976
[51] Int. Cl.² ............................................. G03B 27/58
[52] U.S. Cl. .................................................... 355/74
[58] Field of Search .................. 355/60, 62, 63, 68–71, 355/72, 75, 76, 54, 125, 131, 122, 123, 72, 74; 40/156, 158 B

[56] References Cited
U.S. PATENT DOCUMENTS

| | | | |
|---|---|---|---|
| 813,531 | 2/1906 | Spencer | 355/131 |
| 1,946,810 | 2/1934 | Rowell | 355/75 |
| 2,453,431 | 11/1948 | Grover | 355/54 |
| 2,496,701 | 2/1950 | De Groff | 355/72 |
| 3,465,462 | 9/1969 | Arnt-Jensen | 40/156 |
| 3,682,547 | 8/1972 | Ratowsky | 355/74 |

Primary Examiner—Donald A. Griffin
Attorney, Agent, or Firm—Roy C. Hopgood; John M. Calimafde; Charles W. Neill

[57] ABSTRACT

This easel holds photographic paper in position for exposure during an enlarging operation. The paper is placed on a plate and pushed up against a shoulder at one end of the plate; after which a masking frame is swung down into contact with the paper to hold it flat. Retaining elements extending from the shoulder hold the paper flat on the plate and prevent it from curving upward along the shoulder where the paper could be bent and creased when the masking frame swings down into contact with the paper.

9 Claims, 6 Drawing Figures

EASEL WITH MASKING FRAME

BACKGROUND AND SUMMARY OF THE INVENTION

Photographic paper on which enlargements are to be printed must be accurately held in position with respect to the enlarger, and this is ordinarily done by having an easel located in the proper position and providing means for quickly and conveniently inserting successive sheets of photographic paper into position on the easel.

The easel of this invention is a simple and inexpensive easel which holds paper of a single size. It has a plate on which the paper is held and a masking frame that is hinged to the plate. The paper is placed on the plate in contact with a shoulder for limiting the extent to which the paper is pushed into position; and when the masking frame is swung into position to overlie the paper, one side of the masking frame is immediately adjacent to the shoulder.

If the paper curves upwardly, to only a limited degree along the shoulder, the closing of the masking frame will bend the paper at the corner where the shoulder meets the plate, and, in addition to the prints being unsymmetrical on the paper, the print will be injured by the crease along its edge.

This invention provides retaining means at the shoulder toward which the paper is pushed when originally placed on the easel. The retaining means are far enough above the surface of the plate to make it easy to insert the paper under the retaining means and yet have the paper held against the shoulder. When the masking frame is closed into position to hold the paper, the portion of the frame along the shoulder pushes the retaining means downward and makes it impossible for any of the edge portion of the paper at the shoulder to be creased against the shoulder.

The retaining means are preferably wire clips attached to the back of the flange which provides the shoulder, and these wire clips extend through openings in the shoulder but have sufficient resilience to bend when pushed down by the masking frame; and they have sufficient resilience to move back into a spaced position from the plate when the masking frame is again moved to an open position.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
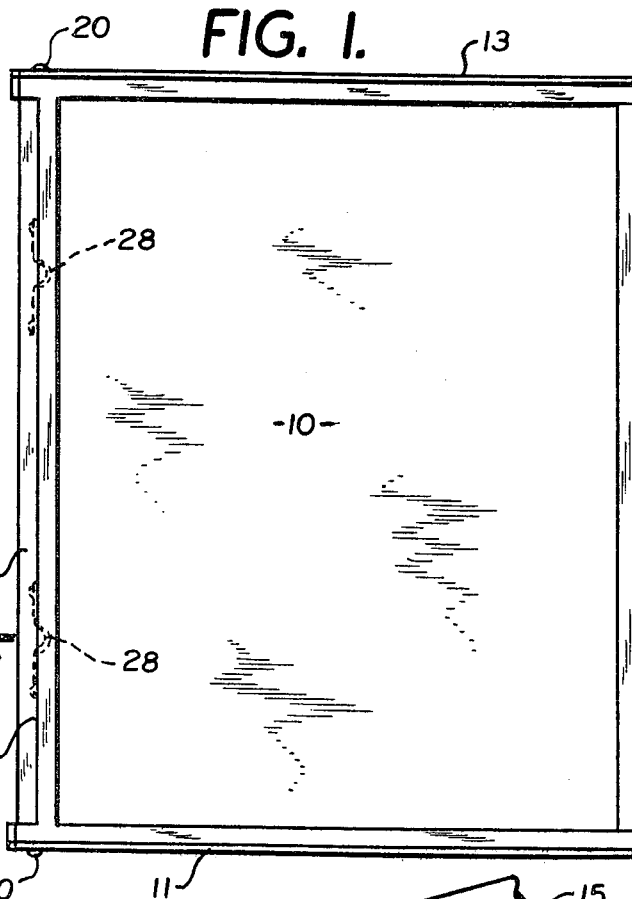
FIG. 1 is a plan view showing the easel of this invention with the masking frame in position for holding the paper against the plate of the easel.
Figure 2:
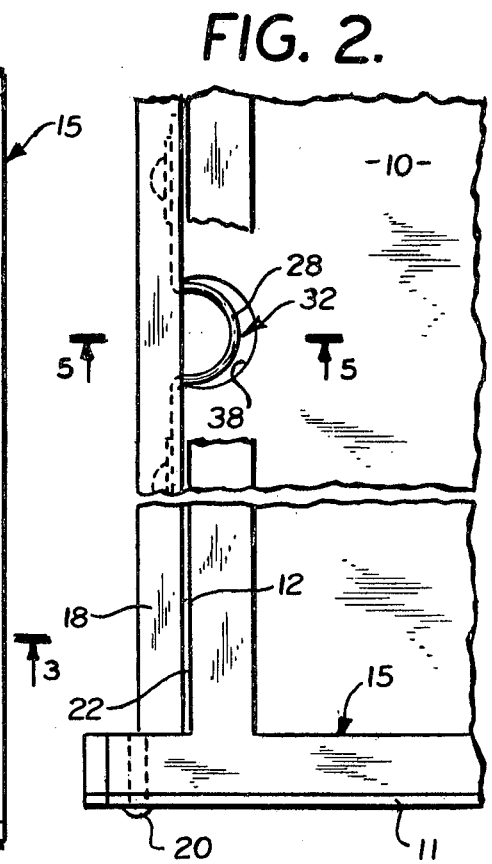
FIG. 2 is a greatly enlarged plan view of one corner of the easel shown in FIG. 1 with parts broken away to expose underlying elements.

FIG. 1 shows an easel consisting of a plate 10 with upturned edges 11, 12 and 13 defining a supporting area of the size of photographic paper for which the easel is intended to be used. A masking frame 15 is connected to the plate 10 by hinged connections, so that it can swing upwardly away from the plate 10, as shown in FIG. 2.

The masking frame 15 has four sides which fit snugly within the upturned shoulders 11–13 when the masking frame is in its downward position when exposing a sheet of photographic paper on the easel.

The shoulder 12 is of somewhat different construction than the other shoulders, and it has a top portion 18 which extends rearwardly from the surface of the shoulder 12 with which the paper contacts. The plate 10, shoulders 11–13, and the rearward extension 18 are preferably of one-piece construction.

The rearward part of the masking frame 15 is hinged to the plate 10 by pivot pins 20 extending through the rearward end portions of the flanges 11 and 13. FIG. 2 shows this construction for one side of the easel, and it will be understood that the construction on the other side is the same.

Figure 3:
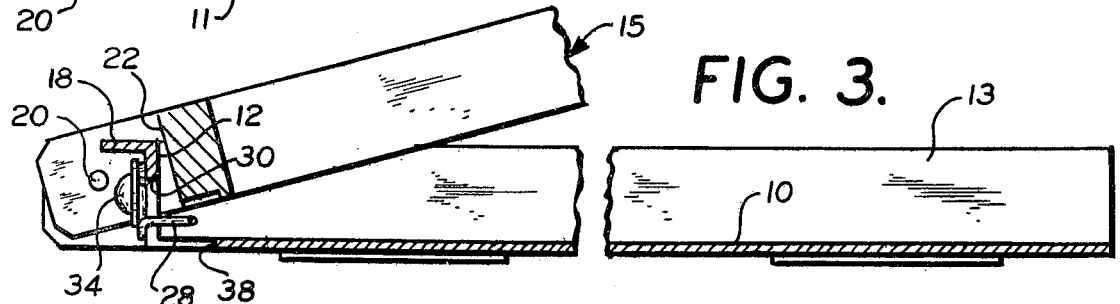
FIG. 3 is an enlarged view, partly broken away, taken on the line 3—3 of FIG. 1, but with the masking frame shown partly lifted from the supporting plate of the easel.

When the masking frame 15 swings downwardly into contact with the plate 10, or a piece of paper on the plate 10, the part of the mask which confronts the shoulder 12 is immediately adjacent to this shoulder, as will be evident from FIG. 2, where the confronting side of the masking frame is indicated by the reference character 22. This same part of the masking frame is also indicated in FIG. 3.

When a piece of paper is pushed across the plate 10 toward the shoulder 12, the paper will often have enough concave curvature to cause it to contact with the shoulder 12 some distance above the corner where the shoulder meets the plate 10.

In such a case, when the masking frame is brought down, the excess length of paper will be bent into the corner at the bottom of the shoulder 12 and creased. This ruins the print.

Figure 6:
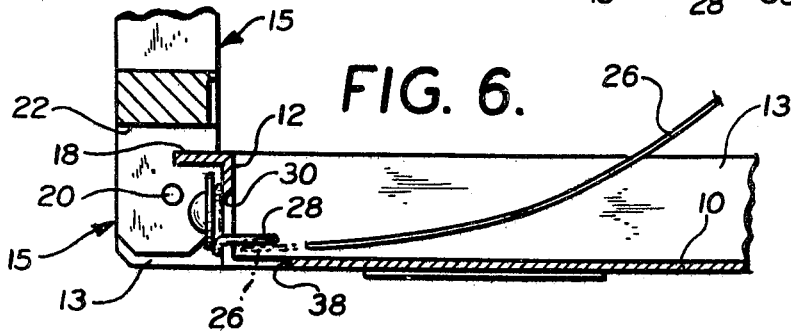
FIG. 6 is a diagrammatic view along the same section line as FIG. 5 but showing the way in which a piece of paper is inserted into position on the easel and brought into contact with the shoulder under the wire clips.

FIG. 6 shows a piece of photographic paper 26 which is being pushed across the plate 10 toward the shoulder 12. The broken lines show the paper 26 when it reaches the shoulder 12 and show a retaining element 28 holding the edge of the paper down against the plate 10, so that when the paper is released, its edge portion cannot curl up along the shoulder 12.

There is an opening 30 through the shoulder 12. The retaining element 28 is made of wire 32 which is bent to the desired shape and secured to the back of the shoulder 12 by screws 34 which thread into the back of the shoulder 12. The wire 32 is shaped so that it extends forward with a rounded shape, as shown in FIG. 2 by the reference character 28.

Figure 4:
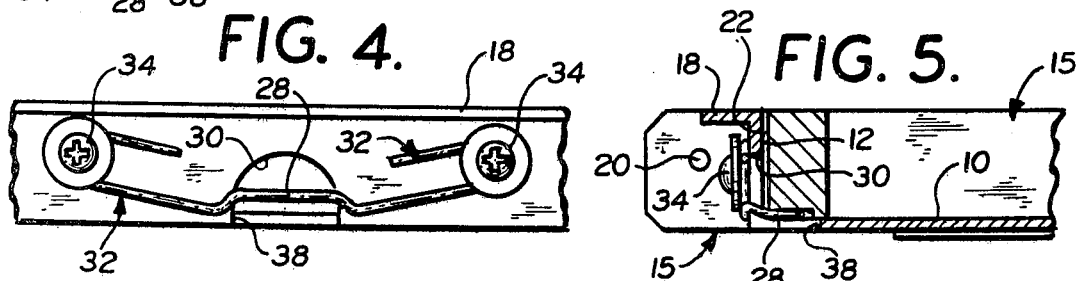
FIG. 4 is a greatly enlarged fragmentary view of a part of the back of the easel illustrating the construction of the clips for holding the paper down along the shoulder which is used when originally locating a sheet of paper on the easel.
Figure 5:
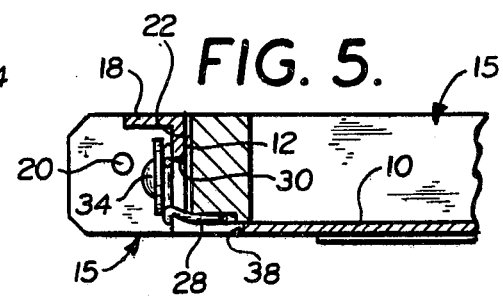
FIG. 5 is a greatly enlarged sectional view taken on the line 5—5 of FIG. 2 and showing the wire clip of FIG. 4 in section.

While the paper 26, shown in FIG. 6, is of greatly exaggerated thickness for clearer illustration, it will be understood that the paper can be placed in position much more quickly and conveniently if the retaining element 28 is located above the plate 10 by a distance substantially greater than the thickness of a sheet of paper. The wire 32 (FIG. 4), of which the retaining element 28 is made, is bent with curves located in such positions that the retaining element 28 can move downward as the masking frame closes. In order to prevent the wire of the retaining element 26 from being clamped firmly against the paper 26 and possibly marking the paper, there is an opening 38 (FIG. 2) under the retaining element 28 and extending for some distance beyond the retaining element so that the paper immediately below the retaining element 28 spans the opening 38 and can depress, if necessary, to avoid excess pressure by the retaining element 28.

Referring again to FIG. 4, the wire 32 is resilient enough, and so shaped, that it can be deflected downward by the masking frame, and it has sufficient resilience to return to its original position when the masking frame opens.

On easels of small size, a single retaining element 28 can be used; but on most easels, at least two such retaining elements are used. They make it unnecessary to insert the paper as slowly and carefully as would otherwise be necessary and thus save time and improve the output of the equipment.

The preferred embodiment of the invention has been illustrated and described, but changes and modifications can be made, and some features can be used in different combinations without departing from the invention as defined in the claims.

What is claimed is:

1. An easel for holding paper for photo-enlarging, including in combination a plate on which a sheet of photographic paper rests, a frame that holds the paper against the plate and that provides a mask around an area of the paper that is to be exposed, a hinge at one side of the plate and by which the mask is connected with the plate, the hinge being positioned for movement of the mask into a working position supported from the plate and parallel to the plate with just one sheet of paper between the masking frame and the plate, a shoulder having a face extending upward from the plate and substantially normal thereto and against which one edge of the paper contacts when placed in position on the plate, the masking frame having a side of substantially rectangular cross-section, adjacent sides of which confront surfaces of the plate and shoulder where the shoulder is normal to the plate, and the hinge connecting the frame to the plate at a location that swings the masking frame into the corner formed by the shoulder at the surface of the plate immediately adjacent to said shoulder when the masking frame is holding the paper on the easel.

2. The easel described in claim 1 characterized by the hinge including portions of the mask that extend beyond the ends of the shoulder, pivots that extend through the extending portions of the masking frame just back from a face of the shoulder that confronts a portion of the masking frame.

3. An easel for holding paper for photo-enlarging, including in combination a plate on which a sheet of photographic paper rests, a frame that holds the paper against the plate and that provides a mask around an area of the paper that is to be exposed, a hinge at one side of the plate and by which the mask is connected with the plate, the hinge being positioned for movement of the mask into a working position supported from the plate and parallel to the plate with just one sheet of paper between the masking frame and the plate, a shoulder extending upward from the plate and against which one edge of the paper contacts when placed in position on the plate, the masking frame having one side immediately adjacent to and confronting the shoulder when the masking frame is holding the paper on the easel, characterized by a retaining element which extends outward from said shoulder for holding down on the plate a paper sheet that is pushed across the plate toward said shoulder and into contact with said shoulder.

4. The easel described in claim 3 characterized by a retaining element extending through an opening in the shoulder, said opening being lower than the vertical height of the masking frame and being hidden when the masking frame swings downward into position where it is supported by the plate.

5. The easel described in claim 3 characterized by the retaining element being a wire clip that extends through the shoulder and at some distance above the surface of the plate to facilitate insertion of a front edge of the paper into space between the plate and clip, the wire of the clip being resilient and bendable downward into contact with the paper when the masking frame swings downward into a position immediately over the paper.

6. The easel described in claim 5 characterized by the plate having a cut-out area providing clearance under the wire clip and for an area somewhat beyond a projection of the wire clip on the plate for providing clearance under the wire clip to accommodate depression of the paper when the wire clip is pushed downward by the masking frame.

7. The easel described in claim 3 characterized by the plate having an upstanding edge portion, the front of which constitutes the shoulder with which the paper contacts to position the paper on the plate, the retaining element constituting a wire having end portions secured to the back of the upstanding edge portion of the plate, the wire having curves therein, including a portion that extends through an opening in the shoulder and around a bend that constitutes the part of the wire that retains the paper in a position adjacent to the plate and that prevents an edge of the paper from bending over and extending up along a portion of the shoulder, the wire being springable and resilient and in position to be displaced downward by the masking frame as the frame swings into position to hold the paper flat on the plate.

8. The easel described in claim 7 characterized by the plate having shoulders at the two sides thereof that extend forward from the shoulder into contact with which the paper is moved when placing the paper on the plate, said easel being adapted for use with only one size of paper.

9. The easel described in claim 8 characterized by the side shoulders of the plate extending rearwardly beyond the middle shoulder with which the paper contacts when moved into position on the plate, the middle shoulder terminating some distance from the rearward extensions of the other two shoulders so as to provide a clearance, the masking frame having rearward extensions therefrom which fit into the clearances at opposite ends of the middle shoulder, and pivot connections joining the extensions of the masking frame to the portions of the side shoulders that extend beyond the middle shoulder and on which the masking frame swings toward and away from the plate.

* * * * *